Dec. 19, 1933. L. B. WACKMAN 1,939,934

PLUG BUSHING AND INNER SEAL THEREFOR

Filed March 30, 1931

Inventor:
Louis B. Wackman.
By H. G. Fletcher
atty.

Patented Dec. 19, 1933

1,939,934

UNITED STATES PATENT OFFICE 1,939,934

PLUG BUSHING AND INNER SEAL THEREFOR

Louis B. Wackman, St. Louis, Mo.

Application March 30, 1931. Serial No. 526,383

3 Claims. (Cl. 220—39)

This invention relates to certain improvements in a plug bushing and inner seal therefor and has for its primary object to provide a bushing with improved seating means for securing a sealing cap in the bushing inwardly of the threads thereof.

Another object of the invention is in providing the bushing with seating means for securing a sealing disc inwardly of the threads of the bushing and the cap to be engaged and held in sealing position by frictional contact with the inner extremity of the bushing.

A further object of the invention is in providing a bushing with an inwardly extending neck on its inner end for securing a sealing cap in the bushing so as to provide an inner seal thereto.

A still further object of the invention is in providing a plug bushing with an improved seating neck for receiving and securing a sealing cap in the neck.

Another still further object of the invention is in providing an improved bushing for a metallic container.

Other and further objects will appear in the specification and be specifically pointed out in the appended claims, reference being had to the accompanying drawing, exemplifying the invention, and in which:—

Figure 1:
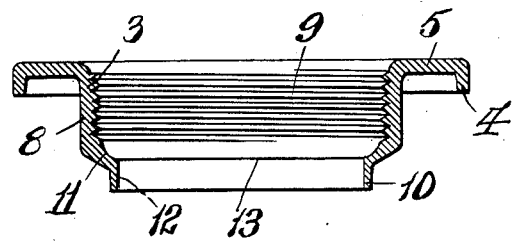
Figure 1 is a transverse vertical section taken through this improved plug bushing.

In the accompanying drawing, 1 designates a portion of a metallic wall of a barrel or container having an annular raised portion 2 thereon which is formed at the time the bung opening is made in the head and secured in the bung opening by welding is a bushing 3.

The bushing 3 is provided with an inwardly extending annular lip 4 on the perimeter of the flange 5 of the bushing, the lip 4 providing means for securing the bushing to the wall 1 of the barrel by welding the lip 4 to the annular lip 6 which is formed around the bung hole of the wall 1, the welding of the lips 4 and 6 occurring as designated at 7.

The bushing 3 is provided with an annular wall 8 which depends from the flange 5, said wall being interiorly threaded as designated at 9 and formed integral with the inner extremity of the wall 8 is a neck 10, said neck being smaller in diameter than the diameter of the annular wall 8. Formed interiorly of the wall 8 inwardly of the threads 9 is an inwardly tapering surface 11 which terminates at its inner end with the inner surface 12 of the neck 10 thereby forming a shoulder 13.

Containers of this character to which this improved plug bushing and inner seal is applicable, are used in shipping oil or derivatives thereof such as gasoline and it quite frequently happens that leakage or seepage of the oil content occurs past the threads of the bushing and the securing plug even though the plug may or may not be loosened. This invention therefore pertains to an improved bushing and an inner seal therefor for the purpose of eliminating seepage or leakage from the container.

Figure 2:
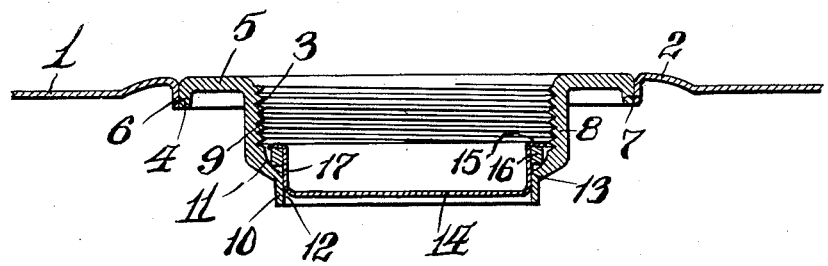
Figure 2 is a view similar to Fig. 1 but showing the bushing secured by welding to a wall of a metallic container and having the sealing cap inserted in the inner disposed neck of the bushing.
Figure 3:
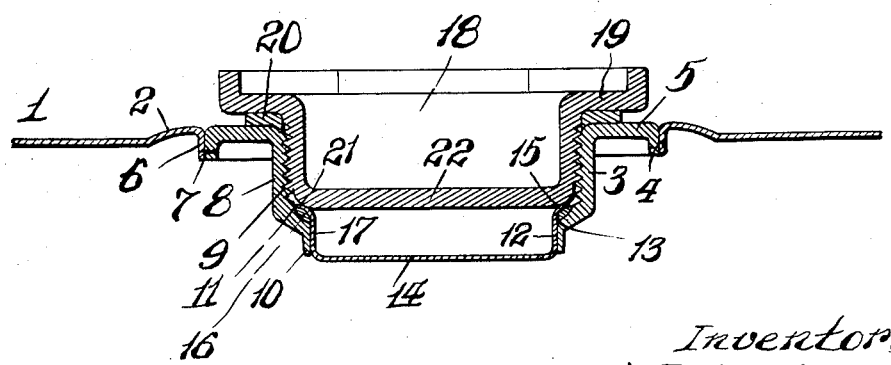
Figure 3 is a transverse vertical section taken through the bushing and wall of the co-relating parts thereof after the bushing is properly secured and sealed.

When a container having this improved bushing structure is filled for shipment, a sealing disc 14 in the form of a countersunk lid or cap having a flange 15 and a gasket 16 against the flange on the sidewall 17 of the cap is inserted in the bushing in the manner shown in Fig. 2 in which the inner surface or edge of the gasket will engage the tapering surface 11 of the bushing wall 8, the diameter of the wall 17 of the cap 14 being approximately the diameter of the inner surface 12 of the neck 10 of the bushing 3.

A threaded closure plug 18 having a flange 19 and a gasket 20 beneath the flange is then engaged in the threads 9 of the bushing 3 and secured by turning the plug in the bushing, the rounded shoulder 21 of the inner end 22 of the plug engaging the flange 15 of the cap 14 thereby forcing the cap 14 downwardly in the neck 10 of the bushing. The inward forcing of the cap 14 will cause the gasket 16 to become distorted and wedged between the flange 15 of the cap 14 and the tapering surface 11 of the bushing wall 8, the gasket 16 being distorted into the shape provided between the tapering surface 11 and the flange 15 thereby providing an efficient seal between the cap flange 15 and the tapering surface 11 of the bushing.

Owing to the fact that the diameter of the sidewall 17 of the cap 14 is approximately the same as that of the inner surface or periphery 12 of the neck 10 of the bushing, the sidewall 17 of the cap 14 will be frictionally engaged against the inner surface 12 of the neck 10 as the wall of the cap 14 is forced therein. The forcing of the cap 14 in the neck 10 of the bushing and the frictional engagement of the wall 17 of the cap with the inner surface of the neck 10, is sufficient to prevent the cap being forced outwardly either by gravitating weight of the contents of the container or by increased pressure in the container which may be brought about by atmospheric conditions. The forced seating position of the cap 14 therefore will be retained even though the plug 18 becomes loosened and consequently the compressed seated position of the gasket 16 beneath the flange 15 of the cap will not be disturbed or loosened and consequently the frictionally held position of the cap in the neck 10 of the bushing will provide a seal to the container contents.

After shipment of a container having this improved plug bushing and inner seal and it is required to remove the contents, upon removal of the plug 18 the cap 14 is pierced or penetrated by a sharp prying or lifting instrument and removed by the instrument.

It is obvious that various changes may be made in the details of construction without departing from the spirit of this invention, and it is therefore to be understood that this invention is not to be limited to the specific construction shown and described.

What I claim is:—

1. A bushing for a metallic container having an inwardly disposed annular seat formed on its inner end, a neck formed inwardly of said seat, a countersunk sealing cap having a flange engaged on said seat and having its sidewall tightly engaging said neck, and a closure plug secured in said bushing in engagement with the upper end of said cap.

2. An interiorly threaded bushing for a container having a seat formed inwardly of the threads thereof, a neck formed inwardly of said seat, and a sealing cap inserted in the bushing having a flange engaging said seat and the sidewall of the cap frictionally engaging said neck, and a plug having a rounded shoulder on its inner end engaging the flange of said cap.

3. An interiorly threaded bushing for a container having a tapered seat formed inwardly of the threads thereof, a neck formed inwardly of said seat, a countersunk sealing cap inserted in the bushing having a gasket flange engaging said seat and the sidewall of the cap frictionally engaging said neck, a gasket interposed between the flange of said cap and said seat, and a plug engaged in the threads of said bushing bearing against the flange of said cap for distorting the gasket against said seat.

LOUIS B. WACKMAN.